United States Patent [19]

Tincati

[11] Patent Number: 5,082,105
[45] Date of Patent: Jan. 21, 1992

[54] ADJUSTABLE STAR WHEEL CONVEYOR FOR CONTAINERS OF CIRCULAR AND NON-CIRCULAR SECTION

[75] Inventor: Franco Tincati, Parma, Italy

[73] Assignee: Sarcmi S.P.A., Parma, Italy

[21] Appl. No.: 552,433

[22] Filed: Jul. 13, 1990

[30] Foreign Application Priority Data

Aug. 2, 1989 [IT] Italy ................. 40125 A/89

[51] Int. Cl.⁵ ............................. B65G 29/00
[52] U.S. Cl. ................. 198/473.1; 198/480.1
[58] Field of Search ........... 198/473.1, 474.1, 475.1, 198/723, 480.1

[56] References Cited

U.S. PATENT DOCUMENTS

| 4,056,185 | 11/1977 | Cartwright | 198/473.1 |
| 4,075,086 | 2/1978 | Marsh, III et al. | 198/473.1 X |
| 4,124,112 | 11/1978 | Mohney et al. | 198/473.1 X |
| 4,790,115 | 12/1988 | Focke | 198/473.1 X |
| 4,938,341 | 7/1990 | Bogatzki | 198/474.1 |

FOREIGN PATENT DOCUMENTS

| 0355971 | 2/1990 | European Pat. Off. | |
| 3143511 | 5/1983 | Fed. Rep. of Germany | |
| 3739579 | 6/1988 | Fed. Rep. of Germany | |
| 220634 | 9/1989 | Japan | 198/473.1 |

Primary Examiner—Robert P. Olszewski
Assistant Examiner—Cheryl L. Gastineau
Attorney, Agent, or Firm—Laff, Whitesel, Conte & Saret

[57] ABSTRACT

The art field is that of conveying systems for containers, more especially containers of circular or near-circular section; in a star wheel typical of the type used to guide and convey bottles, use is made of a radially adjustable push rod to distance the container from the center of the wheel according to its diameter, in conjunction with an essentially circular guide, also adjustable providing external restraint.

6 Claims, 3 Drawing Sheets

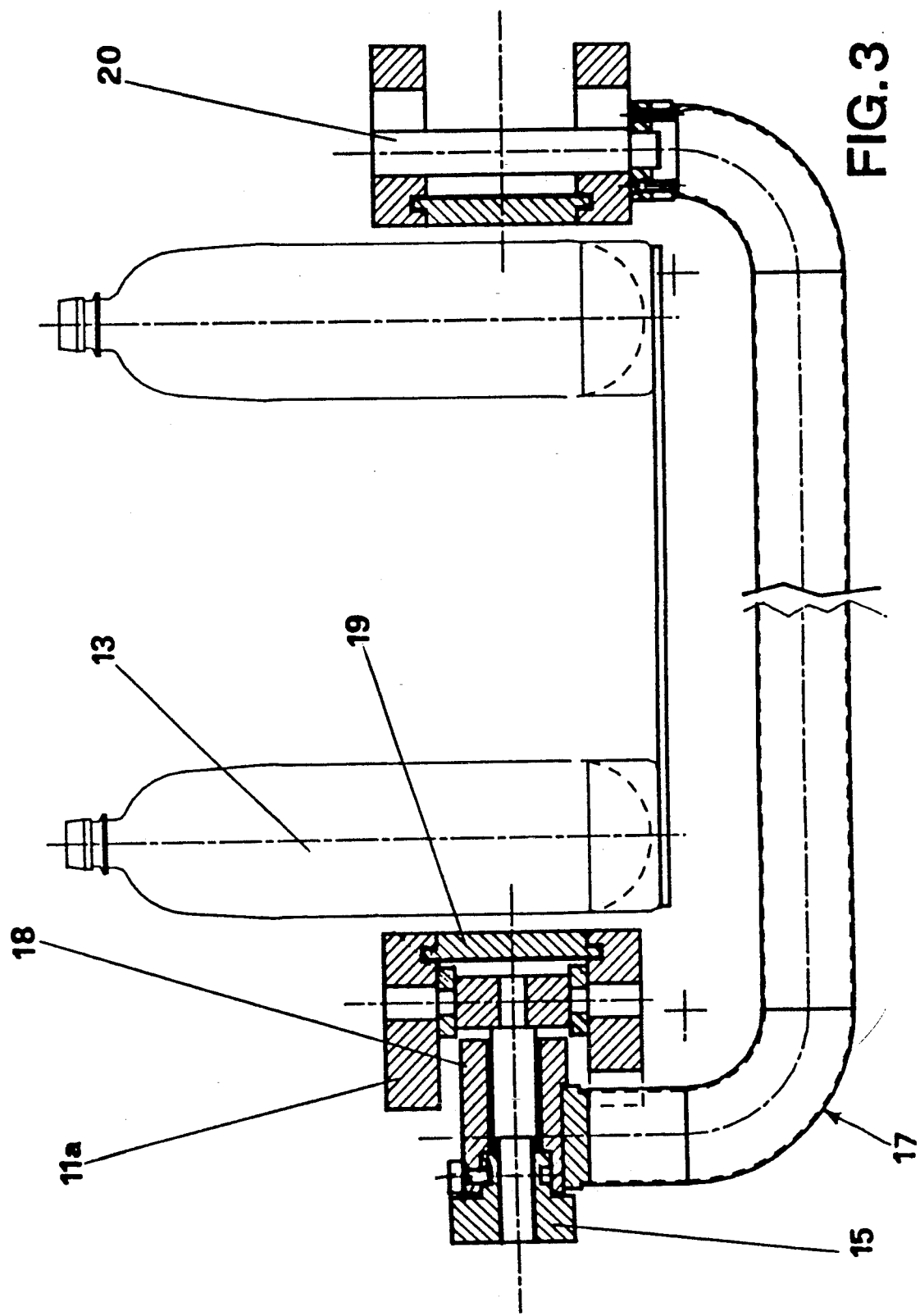

ADJUSTABLE STAR WHEEL CONVEYOR FOR CONTAINERS OF CIRCULAR AND NON-CIRCULAR SECTION

BACKGROUND OF THE INVENTION

The present invention relates to an adjustable star wheel conveyor for containers of circular and noncircular section.

The art field in question embraces various types of systems and machines incorporating a plurality of star wheels serving to carry and guide containers into and from machines at entry and exit point, and in some instances through intermediate paths. Star wheel conveyors consist substantially in a disk rotatable about a center axis and exhibiting an external profile shaped to afford a succession of sockets or recesses (appearing as semicircles with the convex side directed inwards) designed to match the outer shape of the containers destined to be guided and conveyed by the wheel.

One drawback experienced with conventional star wheel design is that a change in size, and more particularly a change in diameter of the containers handled by a given machine in production, dictates removal of the star wheels currently fitted and replacement with others of size and shape to match the new diameter; in consequence, the manufacturer sustains a notable loss of time and a significant cost, with machinery forced to a standstill, as well as being obliged to keep a stock of change wheels and guides.

The object of the present invention is to overcome the drawback outlined above, and more especially, in the event of a change in the size of production container, to allow of adapting star wheels swiftly and simply to accommodate the new size, and in particular a new diameter, without any need for replacement.

SUMMARY OF THE INVENTION

The stated object is comprehensively realized in the adjustable star wheel conveyor disclosed, which is adaptable to circular and non-circular container cross-sections alike.

An adjustable star wheel according to the invention comprises, conventionally, two disks rotatable about a center axis and exhibiting a plurality of external peripheral recesses designed to match the external profile of the containers guided and conveyed by the wheel, and in addition, features a plurality of push rods installed in number equal to the number of recesses and slidable between the two disks in a radial direction, each of which impinges on a relative container; the rods are displaced simultaneously and through an identical distance by a positioning mechanism. The wheel also comprises a peripheral guide embodied in a number of sections, each affording a slot in which a pin engages to enable and limit movement of the guide when moved toward or distanced from the containers by turning a relative handwheel.

BRIEF DESCRIPTION OF THE DRAWINGS

The invention will now be described in detail, by way of example, with the aid of the accompanying drawings, in which:

FIG. 3 illustrates the guide adjustment mechanism in a longitudinal section through the axis of a relative handwheel.

DESCRIPTION OF THE PREFERRED EMBODIMENTS

Figure 1:
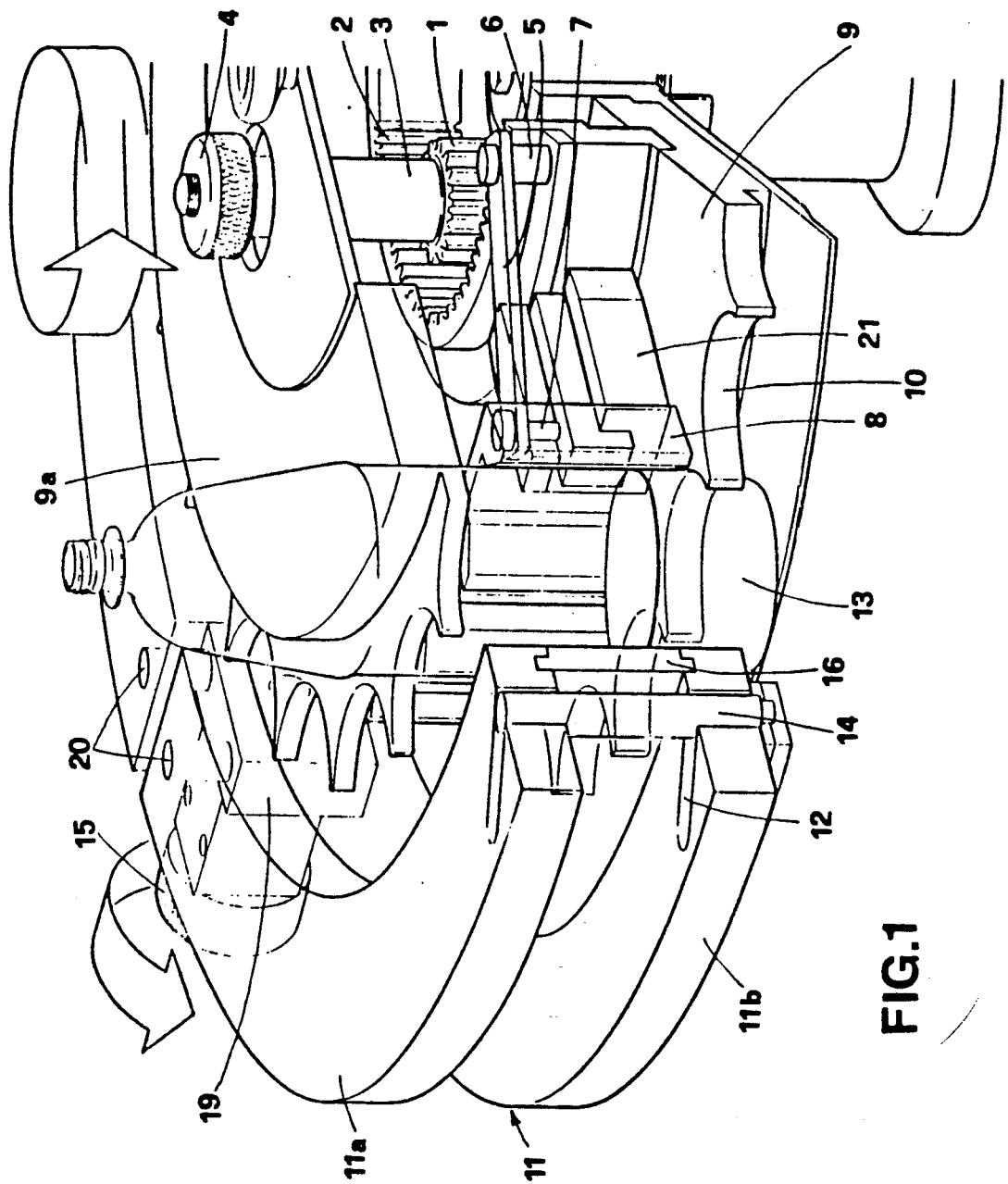
FIG. 1 illustrates a part of the star wheel, viewed in perspective.
Figure 2:
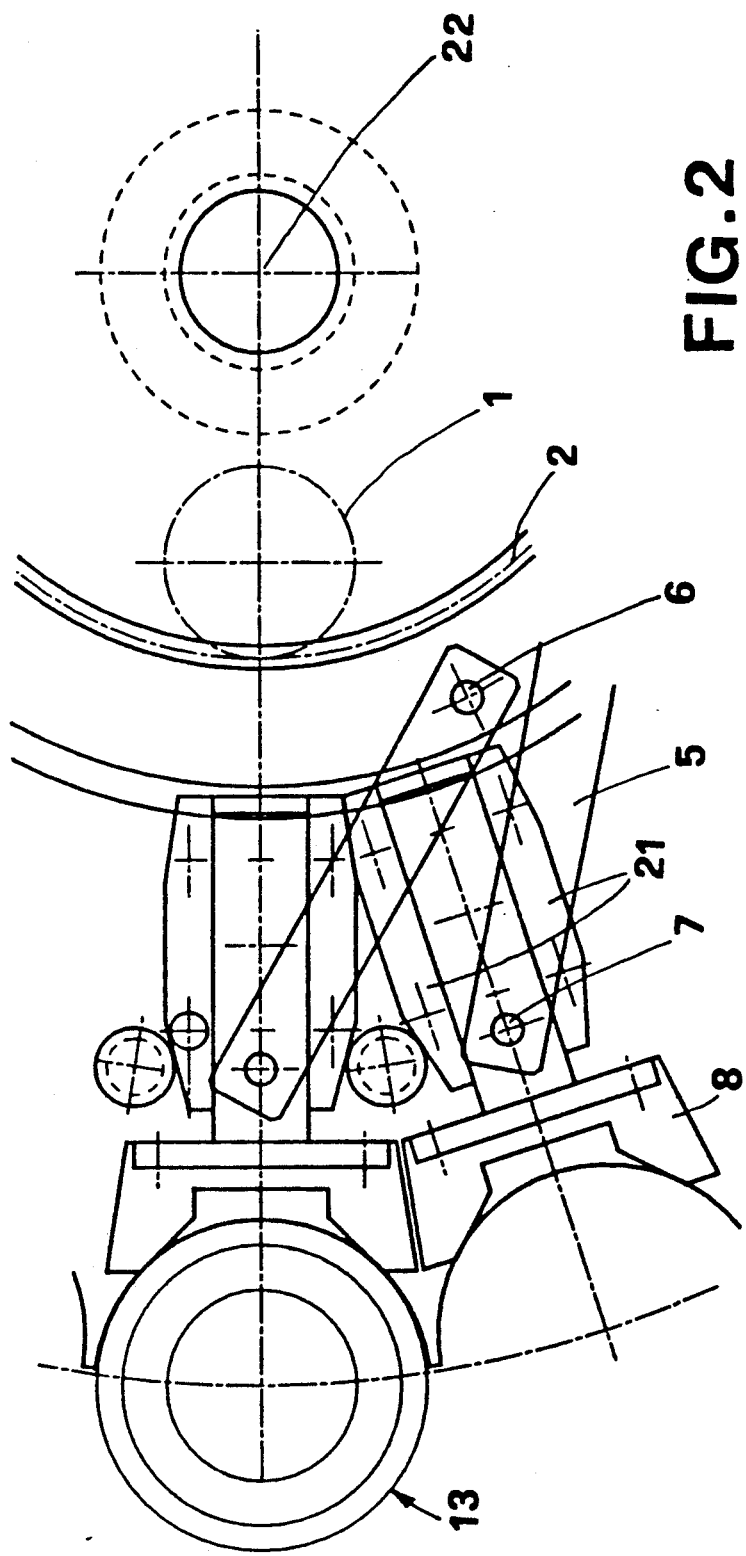
FIG. 2 shows the push rod positioning mechanism in a view from above.

With reference to the drawings, 1 denotes a pinion keyed to a shaft denoted 3 and meshed with a gear 2 carrying a plurality of pivots 6, each connected by way of a rod 5 and a second pivot 7 to a push rod 8 engaging a corresponding container 13. The single push rod 8 is capable of traversing in a radial direction, guided between two side walls 21, the walls in turn positioned between two disks 9 and 9a, each affording a plurality of recesses 10 distributed around its periphery, which constitute the star conveyor wheel The two disks 9 and 9a, associated rigidly one with another, and both with the gear 2, are power driven and rotatable about a common axis denoted 22.

4 denotes a handwheel rigidly associated with the shaft 3 and serving to adjust the position of the , push rods.

Thus arranged, the pinion 1, gear 2, handwheel 4, rods 5, pivots 6-7 and side walls 21 combine to constitute means for positioning the push rods 8. 11 denotes a circular guide located externally of the containers 13, embodied in four divisions each of one quarter circumference and comprising a top section 11a and a bottom section 11b interconnected by a plate 16; the paired sections afford slots 12 at one end serving to accommodate a pin 14, and are linked at the remaining end to the adjacent pair of sections by way of an arrangement that comprises a plate 19 and two pins 20, one insertable in each pair of sections 11a–11b.

15 denotes a handwheel associated with the link plate 19 (see FIG. 3), which engages in a threaded support 18 rigidly associated with the frame 17 of the star wheel and provides the means by which the guide 11 is adjusted for position.

The handwheel 15, support 18 and link plate 19 combine to constitute adjustment means. Operation of the star wheel will now be described. When the need arises to change to a different size of container in production, the operator will turn the push rod positioning handwheel 4 right or left to place the rods respectively nearer to or farther from the guide; similarly, the guide handwheel 15 is rotated right or left to set the sections 11a and 11b respectively closer to or farther from the container and thus adapt the assembly to the new diameter.

To obtain greater precision of the adjustment, i.e. better adaptation of the star wheel to different diameters of container, the circular guide could incorporate a greater number of divisions, operated by a greater number of handwheels than is required for the four divisions of the example illustrated; similarly, use might be made of an automatic system to adjust the handwheels when adapting to different diameters.

What is claimed:

1. An adjustable star wheel conveyor for containers of circular and non-circular section, comprising:
   two disks (9, 9a) rotatable about a center axis (22) and exhibiting a plurality of external peripheral recesses (10) matched to the external profile of the containers guided and conveyed by the wheel;
   a plurality of push rods (8), each impinging on a relative container (13), installed in number equal to the number of recesses (10) and slidable between the two disks in a radial direction;

positioning means by which to effect a radial displacement of the push rods (8) simultaneously and through an identical distance;

an external guide (11) divisible into a plurality of sections, each affording a slot (12) in which to insert a pin (14) designed to permit and limit movement of the guide according to the shape of the slot;

adjustment means, supported by an external frame (17), by which the guide (11) can be moved toward or distanced from the containers in the event of a change in container diameter.

2. An adjustable star wheel conveyor for containers of circular and non-circular section, comprising:

two disks rotatable about a center axis and exhibiting a plurality of external peripheral recesses matched to the external profile of the containers guided and conveyed by the wheel;

a plurality of push rods, each impinging on a relative container, installed in number equal to the number of recesses and slidable between the two disks in a radial direction;

positioning means by which to effect a radial displacement of the push rods simultaneously and through an identical distance, wherein said positioning means comprise a handwheel, rigidly associated with a shaft carrying a keyed pinion in mesh with a gear that carries a plurality of pivots each of which is associated by way of a connecting rod and a further pivot with a corresponding push rod;

an external guide divisible into a plurality of sections, each affording a slot in which to insert a pin designed to permit and limit movement of the guide according to the shape of the slot;

adjustment means, supported by an external frame, by which the guide can be moved toward or distanced from the containers in the event of a change in container diameter.

3. A star wheel as in claim 2, wherein adjustment means comprise at least one handwheel rotatable in a threaded support rigidly associated with the external frame of the wheel and impinging on a link plate by which adjacent sections of the guide are interconnected.

4. A star wheel as in claim 2, wherein the link plate is connected to the guide by way of two pins, each associated with one section.

5. A star wheel as in claim 2, wherein the connecting rod is designed to convert rotary motion of the gear into reciprocating radial motion of the corresponding container push rod.

6. A star wheel as in claim 2, wherein the shape of the slot is such as to ensure the precision of the guide adjustment by regulating the distance of the guide from the container in the vicinity of the slot.

* * * * *